(12) United States Patent
Kuno

(10) Patent No.: US 9,006,924 B2
(45) Date of Patent: Apr. 14, 2015

(54) ELECTRONIC CONTROL DEVICE

(71) Applicant: DENSO CORPORATION, Kariya, Aichi-pref. (JP)

(72) Inventor: Ryotaro Kuno, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 233 days.

(21) Appl. No.: 13/748,722

(22) Filed: Jan. 24, 2013

(65) Prior Publication Data

US 2013/0200698 A1     Aug. 8, 2013

(30) Foreign Application Priority Data

Feb. 3, 2012 (JP) .................................. 2012-21806

(51) Int. Cl.
| | | |
|---|---|---|
| *B60R 16/03* | (2006.01) | |
| *H02J 4/00* | (2006.01) | |
| *H02J 1/00* | (2006.01) | |
| *F02D 41/26* | (2006.01) | |
| *F02D 41/06* | (2006.01) | |

(52) U.S. Cl.
CPC . B60R 16/03 (2013.01); H02J 4/00 (2013.01); H02J 1/00 (2013.01); F02D 41/065 (2013.01); F02D 41/266 (2013.01)

(58) Field of Classification Search
CPC .................................. B60R 16/03; H02J 4/00
USPC .......................................... 307/10.1, 10.6, 52
See application file for complete search history.

(56) References Cited

U.S. PATENT DOCUMENTS

| | | | |
|---|---|---|---|
| 6,791,463 B2 * | 9/2004 | Iwasaki et al. | 340/636.1 |
| 8,384,240 B2 * | 2/2013 | Sato et al. | 307/10.1 |
| 2005/0187681 A1 | 8/2005 | Suzuki et al. | |
| 2006/0256497 A1 | 11/2006 | Sugimura et al. | |
| 2008/0178015 A1 * | 7/2008 | Sago | 713/300 |
| 2008/0309163 A1 | 12/2008 | Hashimoto et al. | |

FOREIGN PATENT DOCUMENTS

| | | |
|---|---|---|
| JP | 1997-060548 A | 3/1997 |
| JP | 2001-202256 A | 7/2001 |
| JP | 2003-315474 A | 11/2003 |
| JP | 2006-316639 A | 11/2006 |
| JP | 3870974 B2 | 1/2007 |
| JP | 2009-022152 A | 1/2009 |
| JP | 2010-180776 A | 8/2010 |
| JP | 4876064 B2 | 2/2012 |

* cited by examiner

*Primary Examiner* — Hal Kaplan
(74) *Attorney, Agent, or Firm* — Posz Law Group, PLC

(57) ABSTRACT

An internal power circuit lowers a battery voltage supplied always from an external side to generate a standby power voltage. A timer continues to measure an elapse of time in a standby state, after a main relay is turned off and supply of a power voltage is interrupted. A measured time data of the timer is saved to a save register during a time measurement operation of the timer. When a stop condition for stopping the time measurement operation of the timer is satisfied, a control circuit stops the operation of the internal power circuit. When the main relay is turned on, the internal power circuit is activated to start its operation again by the control circuit so that the measured time data saved to the save register is restored to the timer.

11 Claims, 6 Drawing Sheets

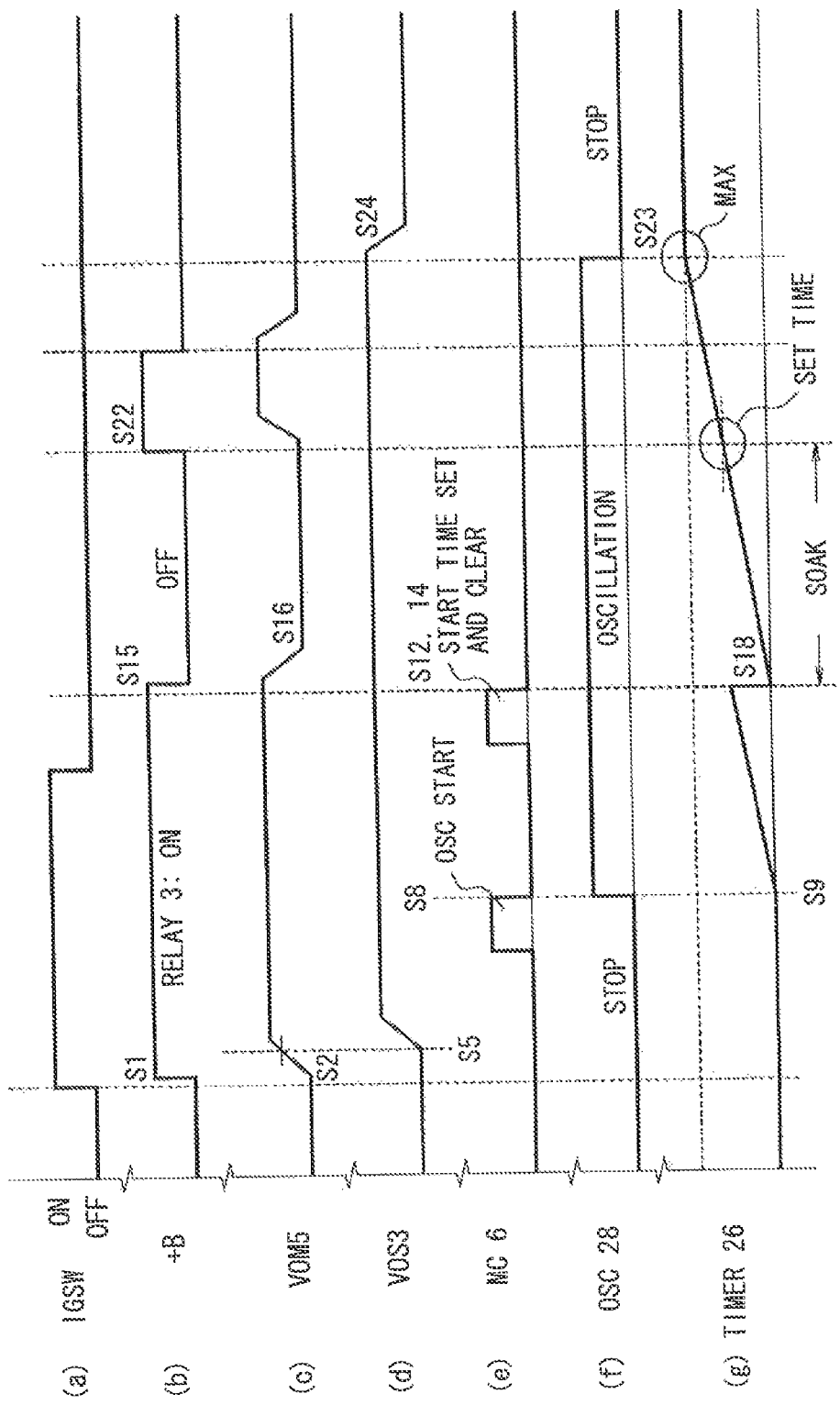

ELECTRONIC CONTROL DEVICE

CROSS REFERENCE TO RELATED APPLICATION

This application is based on and incorporates herein by reference Japanese patent application No. 2012-21806 filed on Feb. 3, 2012.

TECHNICAL FIELD

The present disclosure relates to an electronic control device, which is supplied with a first power voltage always from an external side and has a circuit part supplied with the first power voltage as a second power voltage through a power switch and operable even when the power switch is turned off.

In an electronic control apparatus for controlling an engine of a vehicle, for example, various electronic circuits including a microcomputer as a main circuit are provided as a control part, which performs various processing and operations for engine control. The control apparatus operates with electric power while an ignition switch as a power switch is being turned on. In this control apparatus, it is desired to measure a soak time indicating an elapse of time from a time point, at which the power voltage to the control apparatus is substantially shut off.

For example, the measured soak time is used in heat management control, which changes over control modes at a next engine start time. The heat management control is provided to start the engine after warming up the coolant of the engine thereby to reduce fuel consumption at the engine start time for improved fuel economy and meet the exhaust emission regulation. In this case, fall of the coolant temperature after the ignition switch is turned off need be estimated and hence the soak time need be measured. The soak time also need be measured to perform a leak hole check (EVP leak check) to meet EVPOBD (California exhaust emission regulation), which is designed to check a leak in EVP (evaporator system) connecting a tank, a canister and a surge tank by operating the control apparatus during the soak time.

JP 2003-315474A discloses that a host microcomputer calculates a soak time based on a count value counted up by a soak timer. The soak timer selectively changes over a count-up time interval among predetermined plural count-up time intervals based on a set code included in a command signal outputted from the host microcomputer when an ignition switch (IGSW) is turned off. An integrated circuit (IC) part including the soak timer is operated with a power voltage (sub-power voltage), which is supplied when the microcomputer is turned to be in a stand-by state.

With recent advanced semiconductor process micronization technology, internal circuits of the IC are micro-structured and an operating power voltage for the internal circuits is lowered. For the IC having circuits, which need be operable in the standby state, the power voltage for the standby system need be differentiated for I/O circuits and other internal circuits. A power circuit (regulator) is thus additionally needed for providing a power voltage lowered for the internal circuits. Addition of the power circuit adds power consumption.

SUMMARY

It is therefore an object to provide an electronic control device, which is capable of suppressing an increase of power consumption even in a case that a circuit operating in a standby state is provided.

According to one aspect, an electronic control device includes an internal power circuit, a control circuit, a timer and a data memory circuit. The internal power circuit is supplied with a first power voltage always from an external side and a second power voltage through a power switch from the external side and generates a third power voltage by lowering the first power voltage. The control circuit controls an operation of the internal power circuit. The timer is supplied with the third power voltage and measures at least a time period of turn-off of the power switch. The data memory circuit is supplied with the first power voltage and stores data. While the timer performs a time measuring operation after the power switch is turned off, the data memory circuit saves therein a measured time data of the timer. When a stop condition for stopping the time measuring operation of the timer is satisfied, the control circuit stops an operation of the internal power circuit. When the power switch is turned on, the control circuit starts the operation of the internal power circuit to restore the measured time data saved in the data memory circuit to the timer.

BRIEF DESCRIPTION OF DRAWINGS

The above and other objects, features and advantages will become more apparent from the following detailed description made with reference to the accompanying drawings. In the drawings:

FIG. 4 is a flowchart showing processing executed by the electronic control unit when an ignition switch is turned on;

FIG. 6 is a timing chart showing signal changes produced by the processing of FIG. 4 and FIG. 5 at various points.

DETAILED DESCRIPTION OF EMBODIMENT

Figure 1:
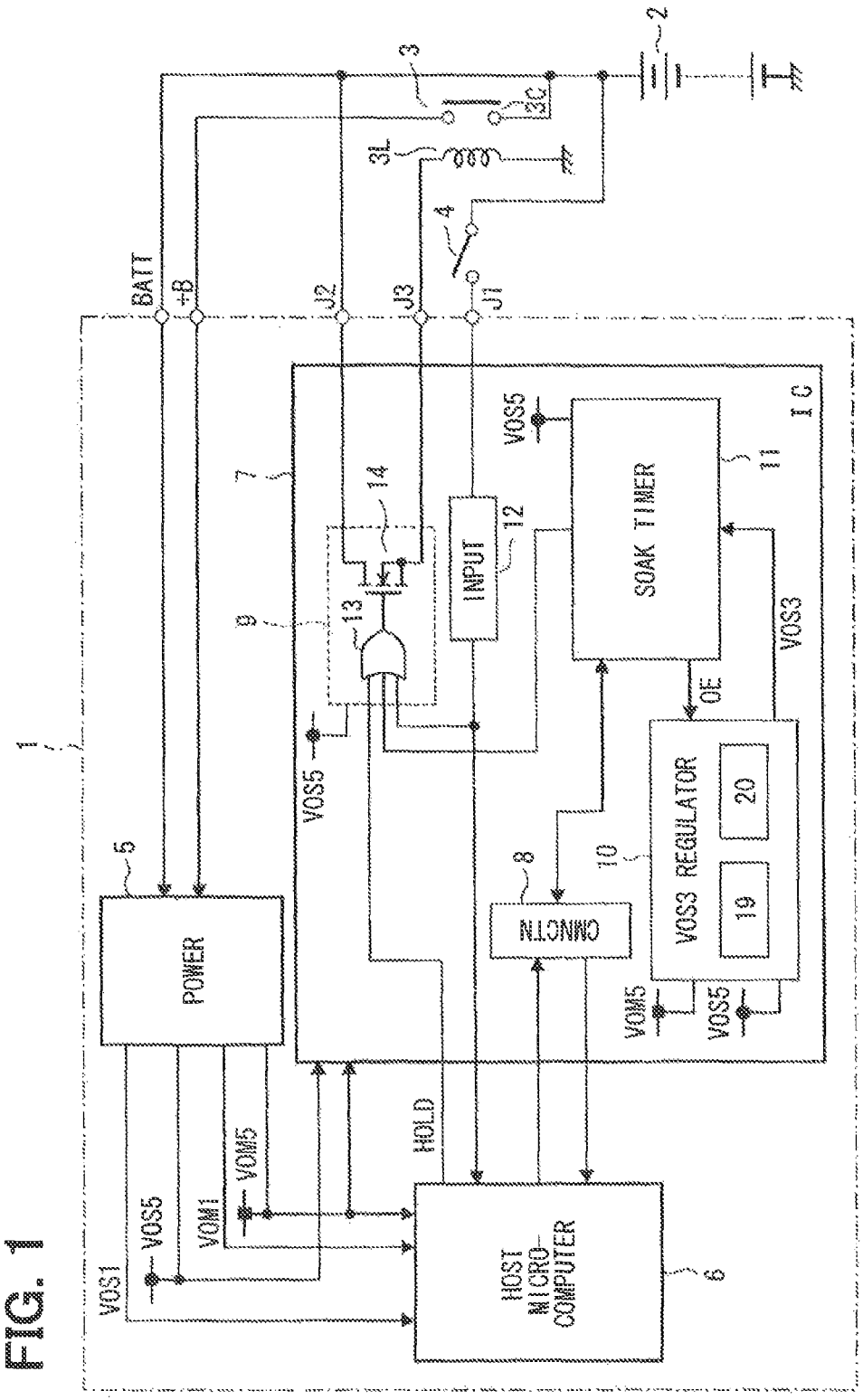
FIG. 1 is a functional block diagram showing an electric configuration of an electronic control unit according to one embodiment.

Referring first to FIG. 1, one embodiment of an electronic control device, which is applied to an electronic control unit (ECU) 1 for a vehicle, will be described in detail. The ECU 1 is provided to control an engine mounted in a vehicle.

The ECU 1 has a battery terminal BATT and a main relay drive terminal J2, which are directly connected to a positive terminal of a battery 2 of the vehicle. A power terminal +B is also connected to the positive terminal of the battery 2 through a normally-open contact 3C of a main relay 3, which is a power switch.

An IGSW terminal J1 is connected to the positive terminal of the battery 2 through an ignition switch (IGSW) 4. A main relay drive terminal J3 is connected to the other end of a coil 3L of the main relay 3, one end of which is connected to the ground. The voltages supplied to the ECU 1 through the battery terminal BATT and the power terminal +B are referred to as a battery voltage BATT (first power voltage) and a power voltage +B (second power voltage), respectively.

The ECU 1 includes a power circuit 5, a host microcomputer (host computer as a high level control device) 6 and a relay control integrated circuit (IC) 7. The power circuit 5 receives the battery voltage BATT, the power voltage +B to generate and output four power voltages VOM5, VOM1, VOS5 and VOS1. These four power voltages have respective magnitudes as follows.

VOM5: main power voltage (5V) for the host computer I/O and the relay control IC 7;
VOM1: main power voltage (1.2V) for a host computer core;
VOS5: standby power voltage (1.2V) for the relay control IC 7; and
VOS1: standby power voltage (1.2V) for the host computer 6.

The standby power voltage VOS5 is the power voltage (first power voltage) supplied always with the supply of the battery voltage BATT. The standby power voltage VOS1 is used to back up data of an internal RAM when the host computer 6 is in the standby state. The power circuit 5 has a power-on reset function, which outputs a reset signal to the host computer 6 from when the main power voltage VOM5 (second power voltage) is outputted in response to supply of the power voltage +B until the power voltage is stabilized. The host computer 6 includes a CPU, a ROM, a RAM and the like (not shown) and executes various control programs for engine control in the known manner.

The relay control IC 7, which is an electronic control device, includes a communication circuit 8, a relay control circuit (activation circuit) 9, a VOS3 regulator circuit 10, a soak timer circuit 11, and an input circuit 12. The communication circuit 8 performs serial communication with the host computer 6 and exchanges data with the soak timer circuit 11. The relay control circuit 9 includes a three-input OR gate 13 and a N-channel MOSFET 14, and is supplied with the standby power voltage VOS5.

Input terminals of the OR gate 13 are connected to the output terminal of the host computer 6, the output terminal of the soak timer circuit 11 and the IGSW terminal J1 through the input circuit 12. Although not shown, the IGSW terminal J1 is pulled down to the ground in the ECU 1 through a resistor element. A source and a drain of the N-channel MOSFET 14 are connected to main relay drive terminals J2 and J3. The input circuit 12 is formed of electronic components, which need no power voltage. The input circuit 12 level-converts the power voltage of the battery 2 inputted from the IGSW terminal J1 through the IGSW 4 to an IGSW signal, which has a level suitable to be inputted to the host computer 6 and the OR gate 13.

Figure 2:
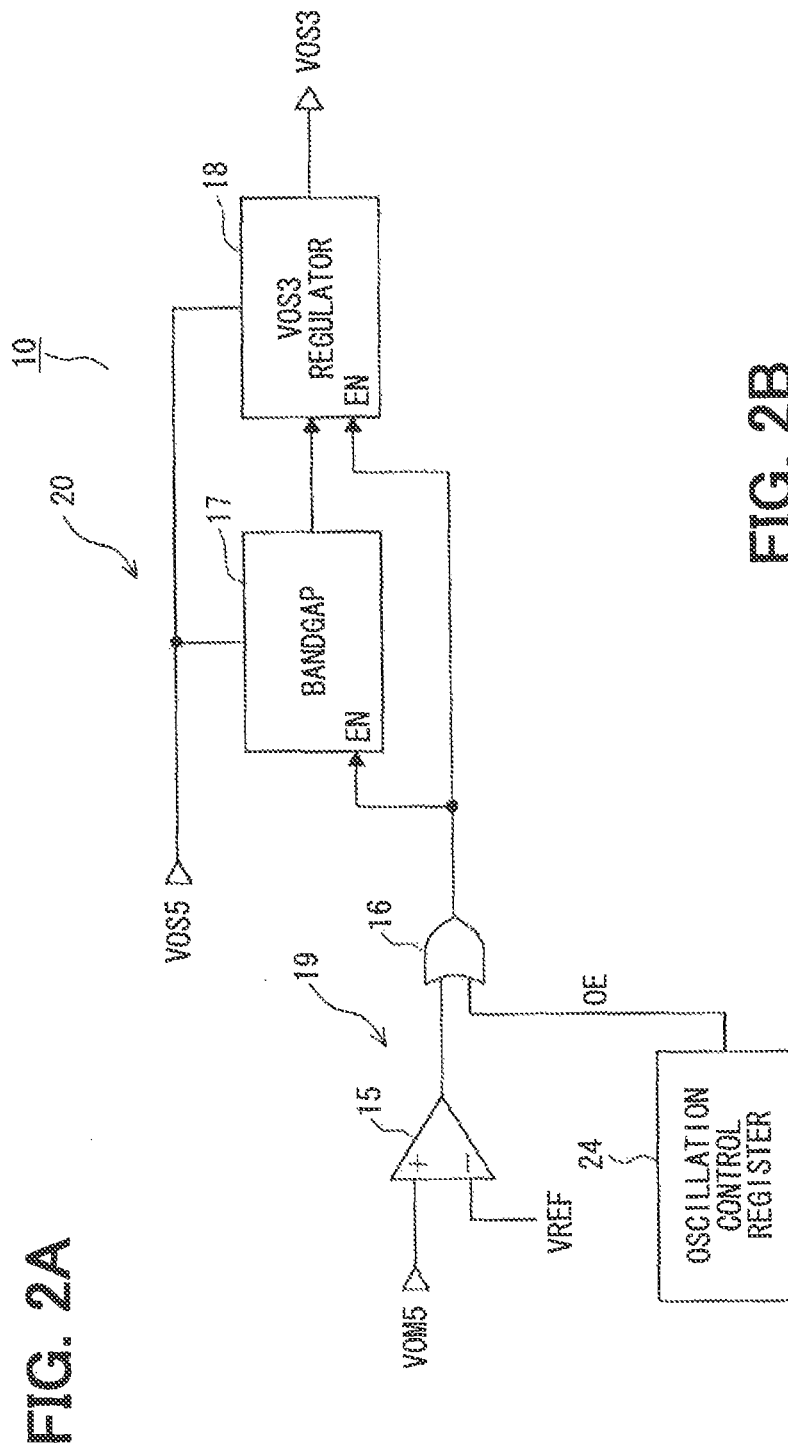
FIGS. 2A and 2B are a functional block diagram and a table showing an internal configuration of a VOS3 regulator part shown in FIG. 1.

The VOS3 regulator circuit 10 is configured as shown in FIG. 2A. The VOS3 regulator circuit 10 includes a comparator 15, an OR gate 16, a bandgap circuit 17 and a VOS3 regulator 18. The main power voltage VOM5 is applied to a non-inverting input terminal of the comparator 15 and a reference voltage VREF is applied to an inverting input terminal of the comparator 15. An output terminal of the comparator 15 is connected to one of the input terminals of the OR gate 16. An oscillation enable signal OE, which will be described later, is applied to the other of the input terminals of the OR gate 16 from an oscillation control register 24 built in the soak timer circuit 11. The comparator 15 and the OR gate 16 form a control circuit 19. The bandgap circuit 17 and the VOS3 regulator 18 form an internal power circuit 20.

The standby power voltage VOS5 is supplied to the bandgap circuit 17 and the VOS3 regulator 18. The bandgap circuit 17 and the VOS3 regulator 18 have enable terminals EN, respectively. An output terminal of the OR gate 16 is connected to the enable terminals EN. The bandgap circuit 17 and the VOS3 regulator 18 become operative when the signal applied to the enable terminals become high. Operations of the bandgap circuit 17 and the VOS3 regulator 18 are shown in a table form in FIG. 28, in which "X" indicates an arbitrary value. The bandgap circuit 17 generates a bandgap reference voltage of about 1.2V and outputs it to the VOS3 regulator 18. The VOS3 regulator 18 generates a standby power voltage VOS3 (third power voltage) of 3V from the reference voltage and supplies the same to the soak timer circuit 11.

Figure 3:
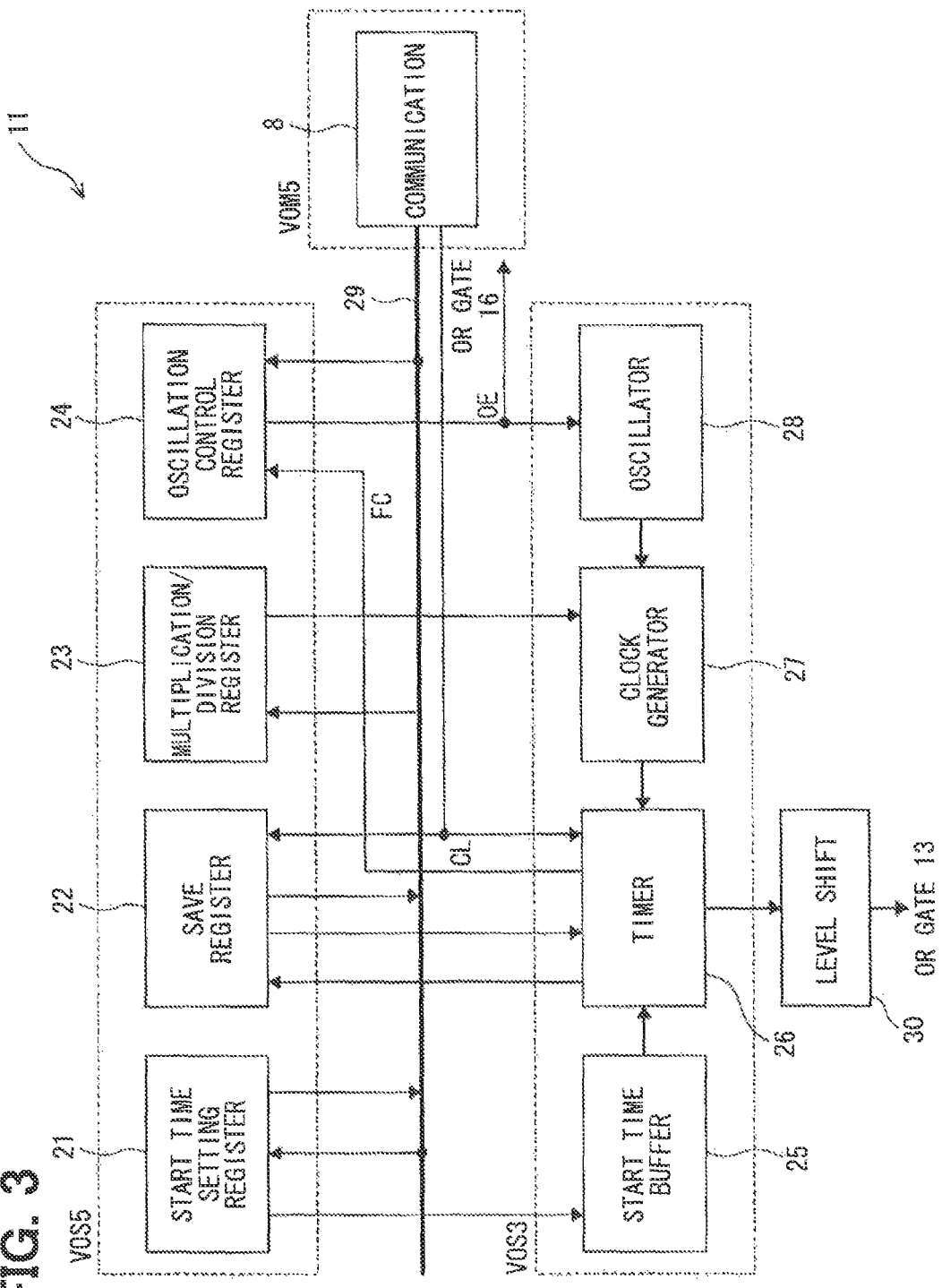
FIG. 3 is a functional block diagram showing an internal configuration of a soak timer part shown in FIG. 1.

The soak timer circuit 11 is configured as shown in FIG. 3. The soak timer circuit 11 includes a start time setting register 21, a save register 22 (data memory circuit), a multiplication/division register (frequency determination part), an oscillation control register 24, a start time buffer 25, a timer 26, an operation clock generation circuit 27 (frequency determination part) and an oscillator circuit 28. The start time setting register 21 is operable when the standby power voltage VOS5 is being supplied. The start time buffer 25 is operable when the standby power voltage VO3 is being supplied. The registers 21 to 24 are connected through the communication circuit 8 and a bus 29.

The start time setting register 21 and the multiplication/division register 23 are written and set with predetermined data, which are transmitted from the host computer 6 through the communication circuit 8, respectively. The data written in the start time setting register 21 and the multiplication/division register 23 are forwarded to the start time buffer 25 and the operation clock generator circuit 27, respectively, after the standby power voltage VOS3 is supplied. The oscillation control register 24 makes the oscillation enable signal OE applied to the oscillator circuit 28 active (high) by writing a predetermined value (for example, 1) as an activation command for the timer 26 by the host computer 6 through the communication circuit 8. The oscillation control register 24 makes the oscillation enable signal OE inactive by writing a different predetermined value (for example, 0) as a stop command for the timer 26.

Data are forwarded between the save register 22 and the timer 26. The host computer 6 is configured to retrieve the data, which is stored in the save register 22, through the communication circuit 8 when necessary.

A clock signal, which is generated by the oscillator circuit 28 at a frequency of, for example, about several MHz, is inputted to the timer 26 through the operation clock generator circuit 27. The operation clock generator circuit 27 is formed of a PLL (phase-locked loop) circuit and the like to output an operation clock signal to the timer 26 after multiplying or dividing the clock signal in accordance with a multiplication/division data written in the multiplication/division register 23.

The timer 26 performs a count-up operation by the operation clock signal. The timer 26 has a built-in comparator (not shown), which compares the time data measured by itself with the start time stored in the start time setting buffer 25. When both of the data agree, a high level signal (coincidence signal) is outputted to the OR gate 13 through the level shift circuit 30. When the measured time reaches a maximum count (full count), the timer 26 outputs a maximum count signal MC to the oscillation control register 24. The oscillation control register 24 is cleared from the set state and makes the oscillation enable signal OE inactive.

The communication circuit 8 directly outputs a clear signal CL to the save register 22 and the timer 26 in response to a command transmitted from the host computer 6. Receiving the clear signal CL, the measured time data stored in the save register 22 is cleared, that is, changed to zero (0) and the data measured by the timer 26 is cleared to zero. In the configuration shown in FIG. 3, when a signal is transmitted between one block supplied with the standby power voltage VOS5 and the other block supplied with the standby power voltage VOS3, the signal level is appropriately shifted by the level shift circuit as described above although not shown.

Figure 4:
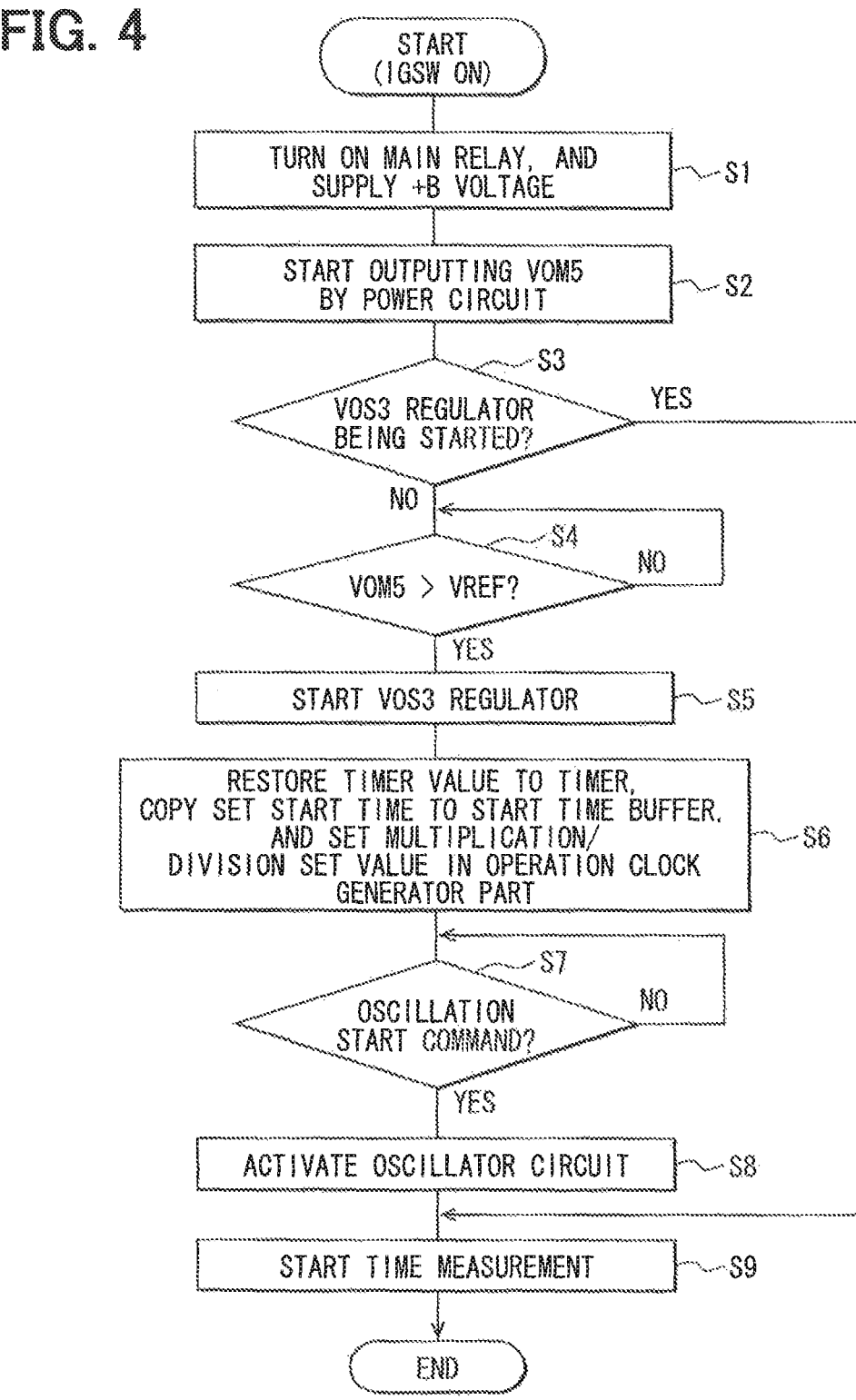
Figure 5:
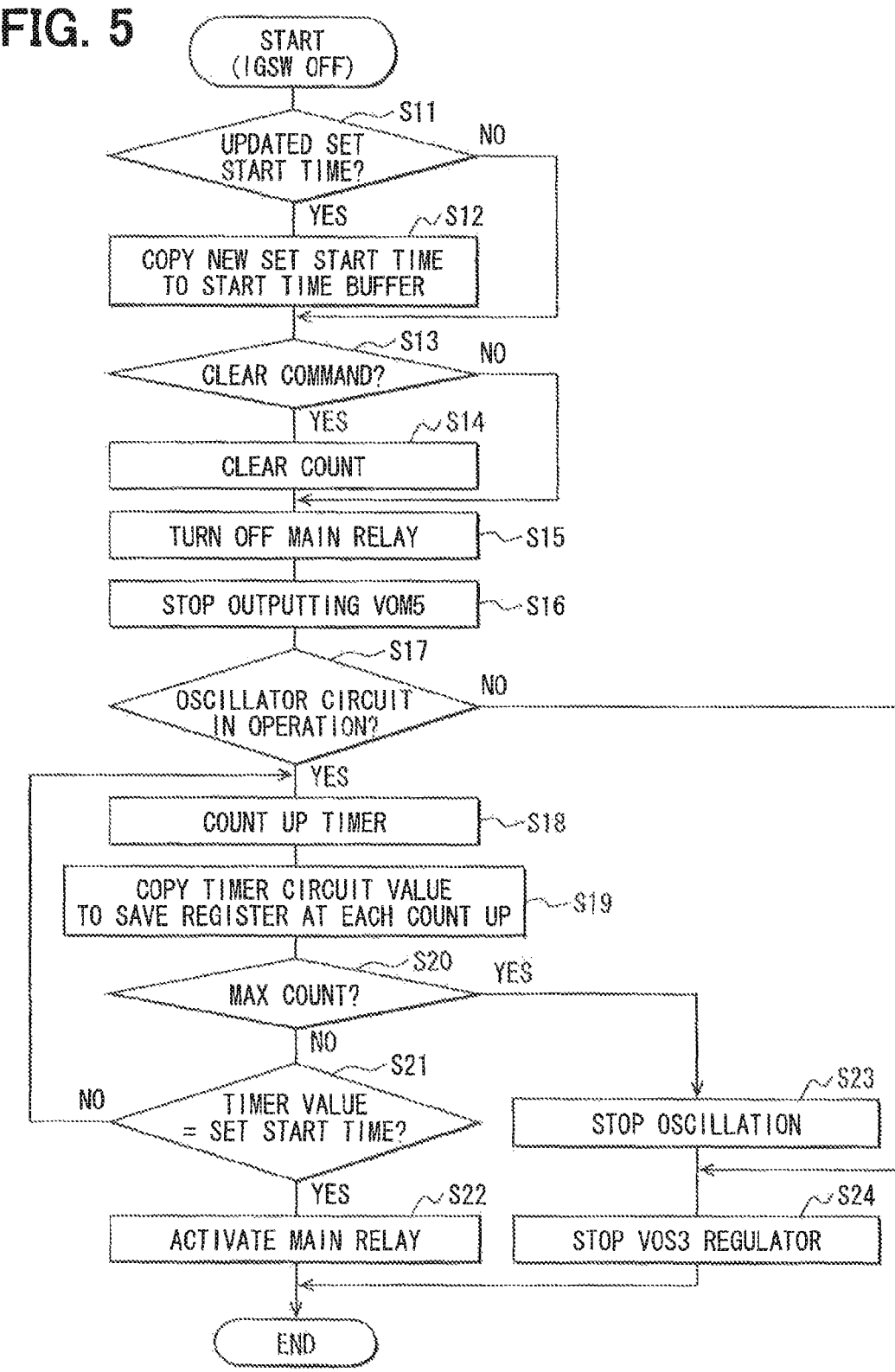
FIG. 5 is also a flowchart showing processing executed by the electronic control unit when the ignition switch is turned off.

An operation of the present embodiment will be described next with reference to FIG. 4 to FIG. 6. FIG. 4 shows processing (both hardware and software) executed by the ECU 1 when the IGSW 4 is turned on by a passenger of the vehicle. FIG. 5 shows processing executed by the ECU 1 when the IGSW 4 is turned off. FIG. 6 shows signal changes produced by the processing of FIG. 4 and FIG. 5.

When the IGSW 4 is turned on as shown by (a) in FIG. 6, the gate of the N-channel MOSFET 14 is raised to high level through the OR gate 13. The N-channel MOSFET 14 is turned on to supply the battery voltage to the coil 3L of the main relay 3. The normally-open contact 3C is closed and the power voltage +B is supplied to the power circuit 5 (S1 in FIG. 4 and (b) in FIG. 6). The power circuit 5 thus starts supply of the main power voltage VOM5 (S2 in FIG. 4 and (c) in FIG. 6). Although not described in detail, the main power voltage VOM1 for the core of the host computer 6 is also supplied at the same time as the main power voltage VOM5.

Immediately after supply of the main power voltage VOM5 is started, the VOS3 regulator part 19 is still stopped (S3: NO). When the voltage of the main power voltage VOM5 rises and reaches the reference voltage VREF, the output terminal of the comparator in the VOS3 regulator circuit 10 becomes high (S4: YES). The enable signal is applied to the bandgap circuit 17 and the VOS3 regulator 18 through the OR gate 16 thereby to activate the bandgap circuit 17 and the VOS3 regulator 18 (S5).

In the soak timer circuit 11, the tinier value saved in the save register 22 is restored (loaded) to the timer 26. The start time set value, which has been set in the start time setting register 21, is copied to the start time buffer 25. The multiplication/division set value, which has been written in the multiplication/division register 23, is set in the operation clock generator circuit 27 (S6). The set value may be identified as the multiplication value or the division value by previously setting predetermined different value ranges for the multiplication value and the division value, respectively.

When the host computer 6 outputs the oscillation start command (S7: YES and (e) in FIG. 6) by writing the predetermined value in the oscillation control register 24 from the host computer 6 though the communication circuit 8, the oscillator circuit 28 is activated and starts its oscillation operation (S8 and (f) in FIG. 6) and the tinier 26 starts time measuring (count-up) operation (S9 and (g) in FIG. 6). It is noted that the timer 26 continues the time measurement operation even in the on-period of the IGSW 4 thereby to check whether the timer 26 is operable normally.

Referring to FIG. 5 next, when the IGSW 4 is turned off ((a) in FIG. 6), it is checked whether the start time setting register 21 is written with data that is, the start time set value is updated, by the host computer 6. If it is updated (S11: YES), the updated data is copied to the start time buffer 25 (S12). When the host computer 6 commands outputting of the clear signal (S13: YES), the communication circuit 8 outputs the clear signal to clear the timer 26 and the save register 22 (S14).

The host computer 6 causes the gate of the N-channel MOSFET 14 through the OR gate 13 to shut off power supply to the coil 3L of the main relay 3 and open the relay contact 3C. As a result, since the voltage of the power voltage +B falls (S15 and ((b) in FIG. 6), the power circuit 5 stops outputting the power voltage VOM5 (S16 and (c) in FIG. 6). As long as the oscillator circuit 28 continues its oscillation operation (S17: YES) thereafter, the timer 26 continues to perform the count-up operation (S18 and (g) in FIG. 6).

In this operation, the time measurement data of the timer 26, that is, the measured time, is copied (forwarded) to the save register 22 each time the data is incremented by the count-up operation S(19). That is, the timer 26 and the save register 22 are configured to operate as described above. For example, after the time measurement data of the timer 26 is forwarded to the save register 22 for the first time, the saved data in the save register 22 is counted up by the same clock as the operation clock of the timer 26.

Until the measured time (timer value) of the timer 26 reaches the start time stored in the start time buffer 25 (S21: NO), step S18 is executed to repeat the count-up operation. When the measured time reaches the start time (S21: YES), the timer 26 outputs the coincidence signal. The N-channel MOSFET 14 is responsively turned on to supply power voltage to the coil 3L of the relay 3 and close the relay contact 3C. The power voltage +B is supplied to the power circuit 5 (S22). As a result, the main power voltage VOM5 is supplied and the host computer 6 starts to operate. The measured time, in which the timer 26 starts its count operation at step S18 until the count reaches the set start time, is the soak time.

The host computer 6, when started, performs a predetermined operation (for example, heat management control or EVP leak check), which is to be performed during the off period of the IGSW 4. Then, the power supply to the coil 3L is shut off to open the relay contact 3C, and remains in the standby state again ((b) and (c) in FIG. 6). When the timer 26 continues its count operation and its count reaches the maximum count (S20; YES and (g) in FIG. 6), a maximum count signal MC is outputted. As a result, the oscillator circuit 38 stops its oscillation operation (S23 and (f) in FIG. 6) and the internal power circuit 20 stops its operation (S24 and (d) in FIG. 6).

According to the present embodiment described above, the standby power voltage VOS3 is generated by lowering the battery voltage BATT, which is supplied always from the external side, that is, continuously even when the IGSW 4 is being turned off. The main relay 3 is turned off to shut off the supply of the power voltage +B. While the timer 26 continues the time measurement operation in the standby state, the measured time data of the timer 26 is saved in the save register 22. When a stop condition for stopping the time measurement operation of the timer 26 is satisfied, the control circuit 19 (FIG. 2A) in the VOS3 regulator circuit 10 stops the operation of the internal power circuit 20 (FIG. 2A) in the VOS3 regulator circuit 10. When the main relay 3 is turned on, the control circuit 19 starts the operation of the internal power circuit 20. The measured time data saved in the save register 22 is restored to the timer 26.

Since the standby power voltage VOS3 need not be supplied while the timer 26 does not perform its time measuring operation, power consumption is reduced by stopping the operation of the internal power circuit 20. Although the internal power circuit 20 is stopped from operating, the measured time data of the timer 26 is saved in the save register 22. When the main relay 3 is turned on, the internal power circuit 20 is started to operate and the saved time data is restored to the timer 26. The timer 26 is thus enabled to continue the time measurement operation, which has been stopped at the time of previous shut-off of the supply of the standby power voltage VOS3. As a result, even if the internal power circuit 20 need be provided to enable the timer 26 to operate in the standby state, it is possible to suppress an increase in the power consumption.

The measured time data is saved in the save register 22 at every count-up operation of the timer 26. As a result, even if the measured time data is not saved at the time of satisfaction of the stop condition of the time measuring operation of the timer 26, the latest measured time data can be maintained in the save register 22. The time measurement stop condition is set to a state, in which count of the timer 26 reaches the maximum count. That is, in the configuration that the host computer 6 is started to operate when the measured time of the timer 26 reaches the start time, it is not necessary to continue the time measurement operation after the count of the timer 26 reaches the maximum count. By thus stopping unnecessary time measurement operation, the power consumption is suppressed from increasing.

The start time of the host computer 6, which operates with the main power voltage VOM5, is set in the start time setting register 21. The relay control circuit 9 turns on the main relay 3 to start the host computer 6, when the measured time of the timer 26 agrees to the set start time. In this case, the set start time is transmitted from the host computer 6 and set in the start time setting register 21 through the communication circuit 8. Thus the host computer 6 can set in the start time setting register 21 the time period, which starts from a time point when the main relay 3 is turned off to stop its operation to a time point when it is started next time by the relay control circuit 9. The start time can be set arbitrarily in accordance with control contents to be performed. In this case, the standby power voltage VOS5 is supplied to the start time setting register 21. As a result, even when the supply of the standby power voltage VOS3 is shut off and the operation of the timer 26 is stopped, the data of the start time can be maintained.

Further, since the host computer 6 is configured to output the start command and the stop command for the timer 26 through the communication circuit 8, the host computer 6 can arbitrarily set the period of time measurement operation of the timer 26. In addition, since the host computer 6 sets also the frequency of the operation clock, which is supplied to the timer 26, through the communication circuit 8, the host computer 6 can arbitrarily set a resolving power of the time measurement operation of the timer 26 in accordance with objects for time measurement. The host computer 6 also outputs the clear command for the timer 26 through the communication circuit 8. The host computer 6 therefore can clear the timer 26 at an arbitrary time point in accordance with its control contents.

When the host computer 6 controls the engine of the vehicle as the ECU 1, it can start its control if necessary by activating by itself even during the turn-off period of the main relay 3. Further it can cause the timer 26 to perform the time measuring operation even during other period so that the measured time may be used in engine control. Since the main relay 3 is turned on and off in response to the IGSW 4, the main relay 3 is turned off when the IGSW 4 is turned off. It is thus possible that the host computer 6 performs required control while the vehicle is stopped. In addition, since the relay control IC 7 is integrated into a semiconductor circuit chip, the entire size can be reduced.

The electronic control device is not limited to only the embodiment described above and shown in the drawings but may be modified as follows.

Although plural power voltages corresponding to the first to the third power voltages are needed, the types and supply voltages of other power voltages may be determined individually.

The multiplication/division register 23 may be provided as the case may be.

The time point of saving the measured time data of the timer 26 to the save register 22 need not be performed at every count-up of the timer 26 but may be performed only once just before the operation of the internal power circuit 20 is stopped.

The start command, the stop command and the clear command for the timer 26, which are applied from the host computer 6 through the communication circuit 8, may be applied differently.

The host computer 6 and the relay control IC 7 may be connected by an address bus and a data bus and integrated into a single integrated circuit thereby to eliminate the communication circuit 8.

The operation stop condition of the timer 26 is not limited to the maximum count but may be set to a predetermined count. Further, it is not limited to a count value but may be set to other parameter in accordance with individual design. The relay control IC 7 need not be provided as a semiconductor integrated circuit but may be formed by discrete components.

The electronic control device is not limited to the system, which controls the engine of a vehicle. The power switch is thus not limited to such a switch, which is turned on and off in response to the ignition switch.

What is claimed is:

1. An electronic control device comprising:
   an internal power circuit, which is supplied with a first power voltage always from an external side and a second power voltage through a power switch from the external side and generates a third power voltage by lowering the first power voltage;
   a control circuit, which controls an operation of the internal power circuit;
   a timer, which is supplied with the third power voltage and measures at least a time period of turn-off of the power switch; and
   a data memory circuit, which is supplied with the first power voltage and stores data, wherein
   while the timer performs a time measuring operation after the power switch is turned off, the data memory circuit saves therein a measured time data of the timer,
   when a stop condition for stopping the time measuring operation of the timer is satisfied, the control circuit stops an operation of the internal power circuit, and
   when the power switch is turned on, the control circuit starts the operation of the internal power circuit to restore the measured time data saved in the data memory circuit to the timer.

2. The electronic control device according to claim 1, wherein:
   the data memory circuit saves the measured time data at every count-up of the timer.

3. The electronic control device according to claim 1, wherein:
   the control circuit stops the operation of the internal power circuit when a count of the timer reaches a maximum count.

4. The electronic control device according to claim 1, further comprising:
   a communication circuit, which is connected to a high level control device operable with the second power voltage and communicates with the high level control device;
   a start time setting register, which sets a start time provided by the high level control device through the communication circuit; and
   an activation circuit, which turns on the power switch when the measured time of the timer reaches the start time set in the start time setting register.

5. The electronic control device according to claim 4, wherein:

the communication circuit transmits a start command and a stop command for the timer from the high level control device.

6. The electronic control device according to claim 4, further comprising:
a frequency setting part, which sets a frequency of an operation clock supplied to the timer, the frequency being set by the high level control device and transmitted through the communication circuit.

7. The electronic control device according to claim 4, wherein:
the communication circuit transmits a clear command provided by the high level control device to the timer and the save register to stop the time measuring operation and clear the measured time data.

8. The electronic control device according to claim 4, wherein:
the start time setting register is supplied with the first power voltage.

9. The electronic control device according to claim 4, wherein:
the measured time data is used by the high level control device to control an engine of a vehicle.

10. The electronic control device according to claim 1, wherein:
the power switch is turned on and off in response to an ignition switch of a vehicle.

11. The electronic control device according to claim 1, wherein:
the internal power circuit, the control circuit, the timer and the data memory circuit are integrated in a single semiconductor circuit.

* * * * *